(12) United States Patent
Soenarjo

(10) Patent No.: US 8,371,536 B2
(45) Date of Patent: *Feb. 12, 2013

(54) AIRCRAFT ELECTRICAL POWER TRANSFER ASSEMBLY

(75) Inventor: Mochamad Agoes Soenarjo, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/328,164

(22) Filed: Dec. 16, 2011

(65) Prior Publication Data

US 2012/0168567 A1 Jul. 5, 2012

Related U.S. Application Data

(63) Continuation of application No. 12/827,120, filed on Jun. 30, 2010, now Pat. No. 8,162,266.

(30) Foreign Application Priority Data

Jul. 29, 2009 (GB) .................................. 0913128.5

(51) Int. Cl.
*B64C 3/58* (2006.01)
*B64C 9/00* (2006.01)
(52) U.S. Cl. ..................... 244/213; 244/214; 244/134 D; 242/388.1
(58) Field of Classification Search ................... 244/213, 244/214, 215, 134 D, 135 A; 242/378, 378.1, 242/378.2, 388, 388.1
See application file for complete search history.

(56) References Cited

U.S. PATENT DOCUMENTS

| 4,469,297 A | 9/1984 | Cole |
| 6,216,979 B1 | 4/2001 | Faure et al. |
| 6,942,079 B2 | 9/2005 | Chang |
| 7,249,735 B2 | 7/2007 | Amorosi et al. |
| 2005/0098405 A1 | 5/2005 | Chang |
| 2008/0078879 A1 | 4/2008 | Weaver |
| 2010/0327111 A1* | 12/2010 | Sanderson .................... 244/99.3 |

FOREIGN PATENT DOCUMENTS

| EP | 0045987 | 2/1982 |
| FR | 2793468 | 11/2000 |
| GB | 2417469 | 3/2006 |
| WO | 2006027624 | 3/2006 |
| WO | 2009010431 | 1/2009 |

OTHER PUBLICATIONS

British Search Report for GB0913128.5 dated Nov. 4, 2009.

* cited by examiner

*Primary Examiner* — Tien Dinh
*Assistant Examiner* — Michael A Fabula
(74) *Attorney, Agent, or Firm* — Lowe Hauptman Ham & Berner LLP

(57) ABSTRACT

An assembly for an aircraft including a first structure mounted to a second structure, and a power transfer assembly electrically connecting the first and second structures. The first structure is movable relative to the second structure between a retracted and an extended position. The power transfer assembly includes a housing, a spool mounted for rotation relative to the housing and biased to rotate in a first direction, and an electrical cable adapted to be wound around the spool when the spool rotates, such that movement of the first structure from its retracted to its extended position causes the cable to be unwound from the spool by rotation of the spool in a second direction opposite the first. Also, a method of electrically connecting the first and second structures. The invention may be applied to an aircraft wing to electrically connect a leading edge slat to a fixed aerofoil portion.

14 Claims, 7 Drawing Sheets

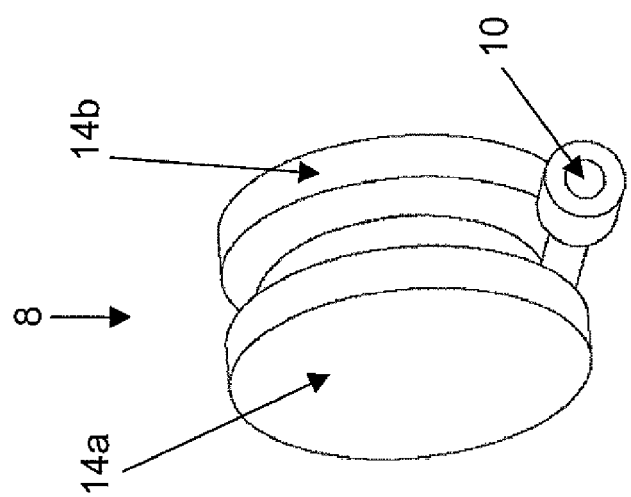
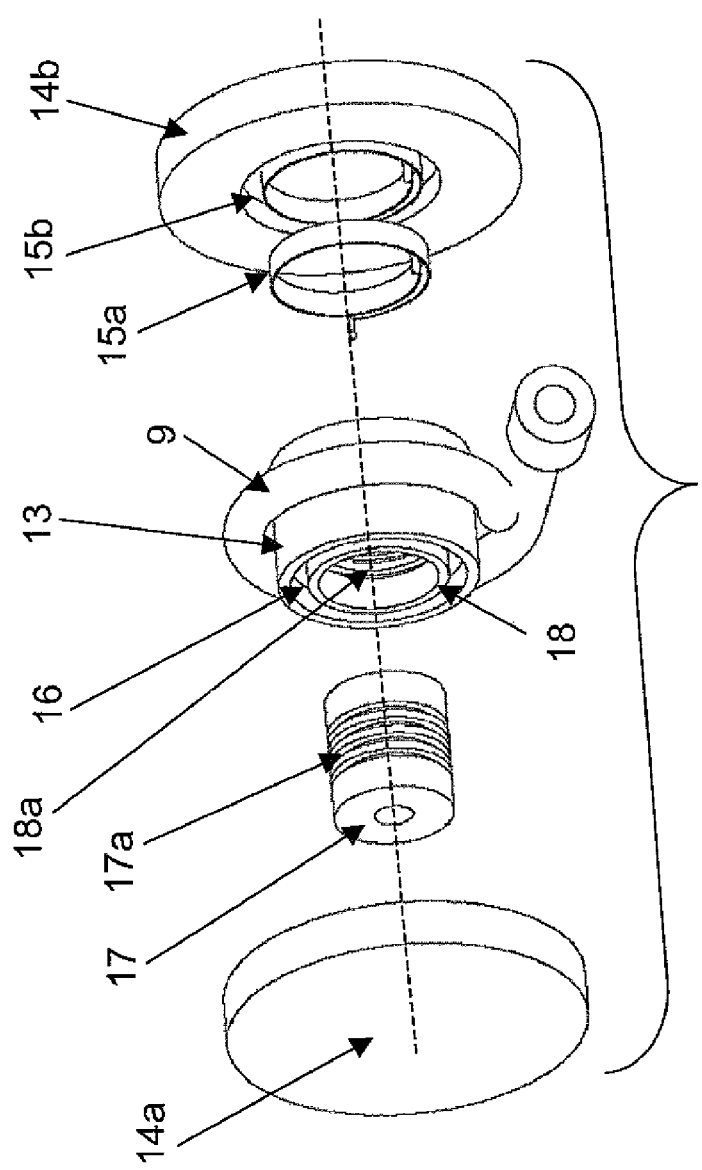

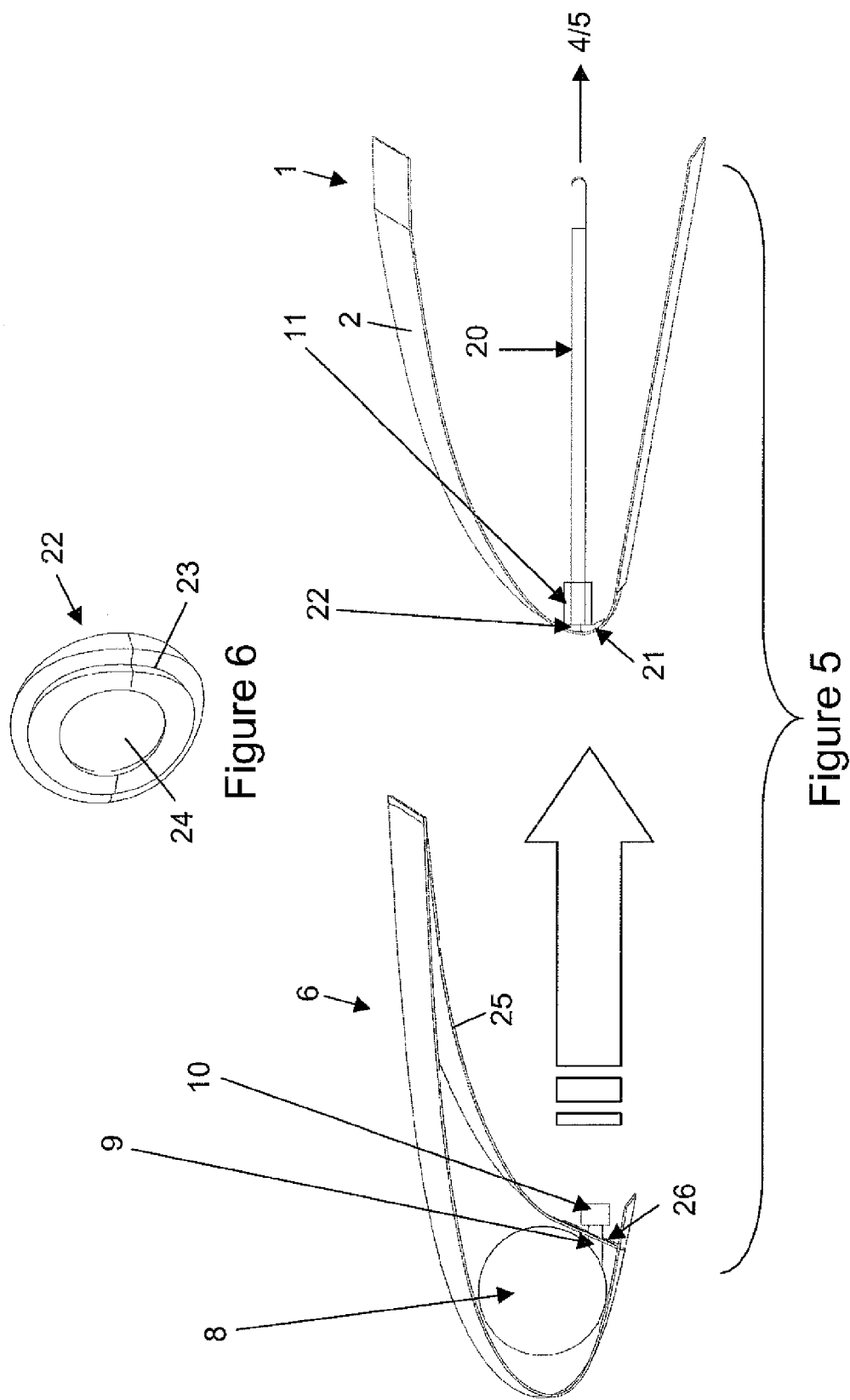

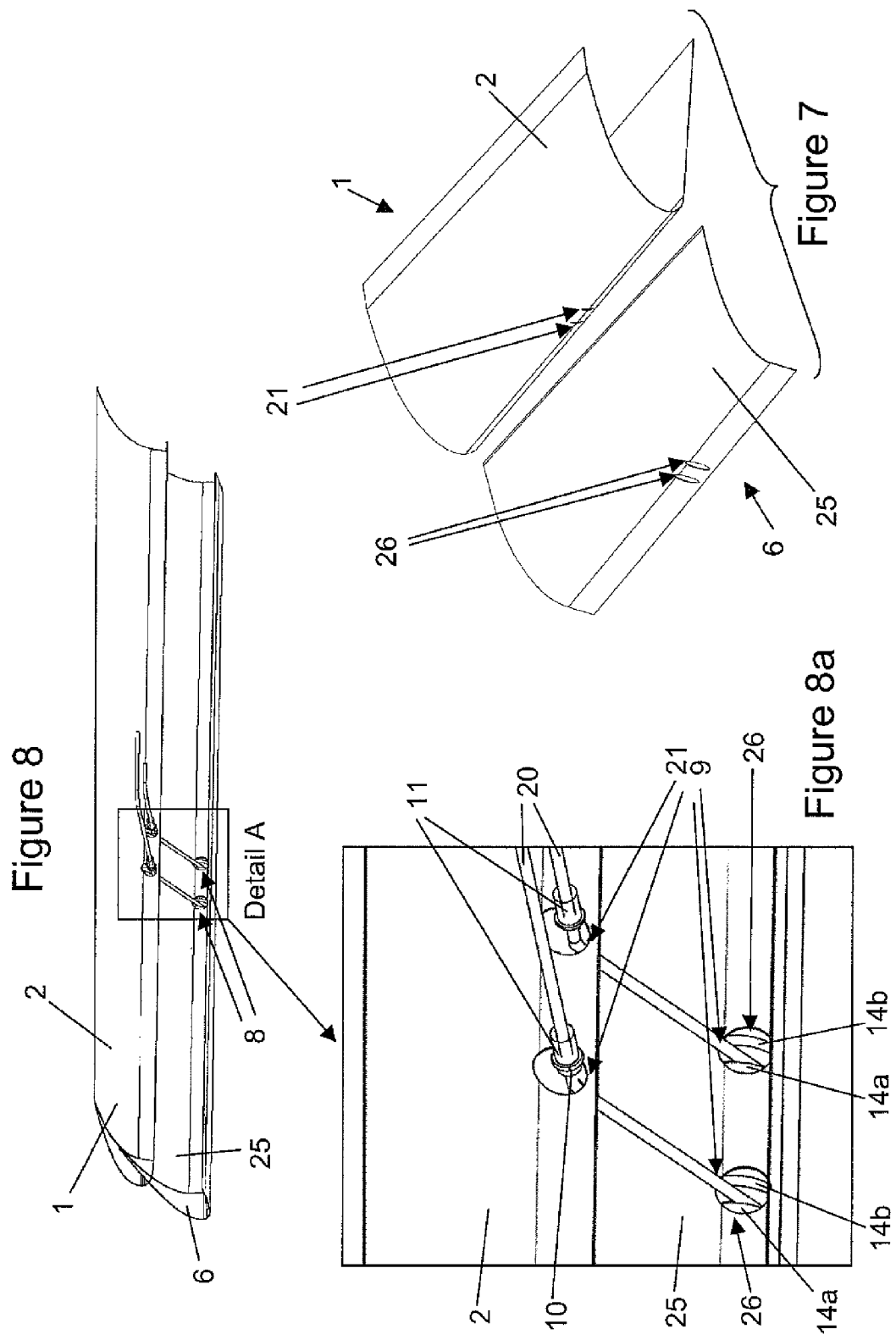

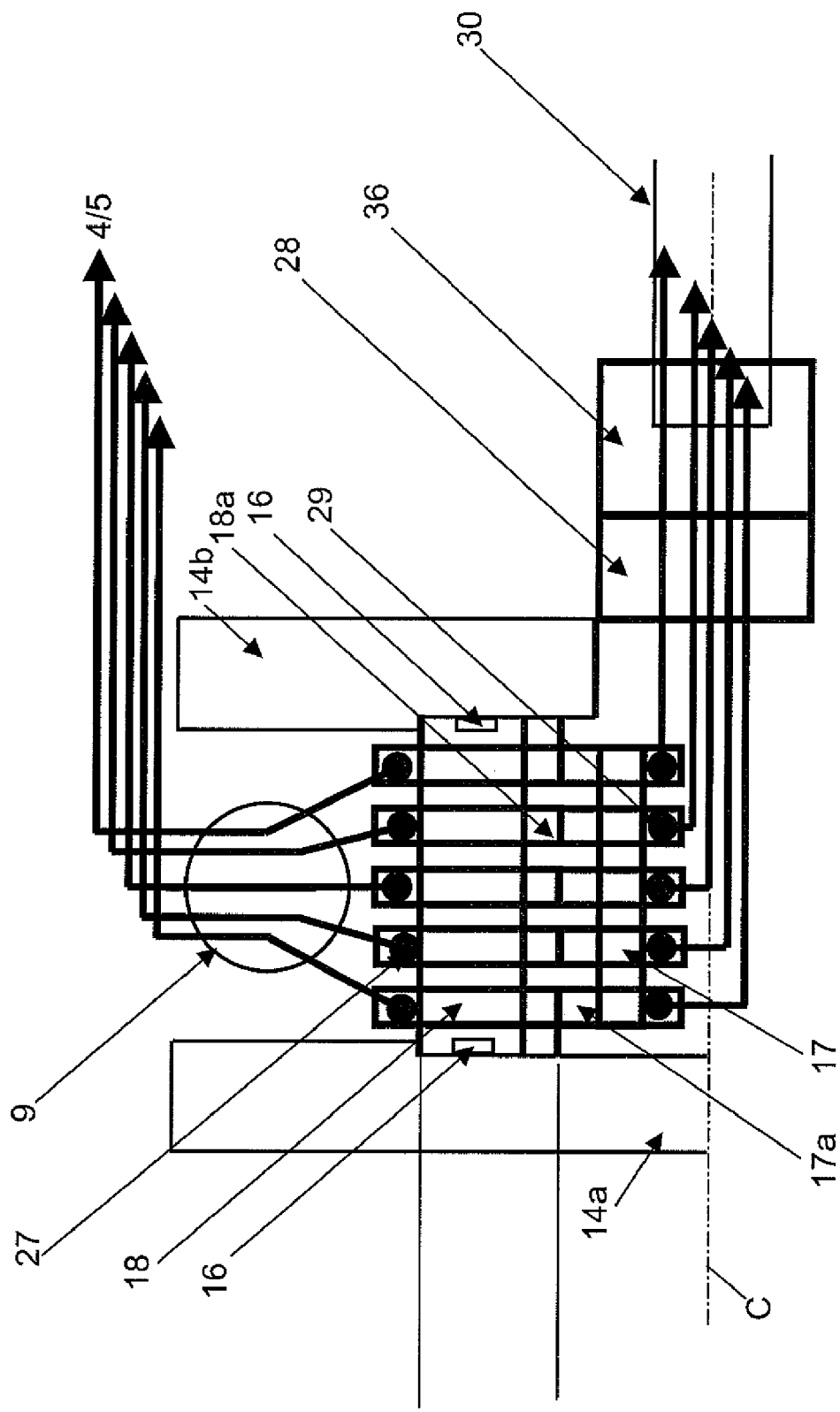

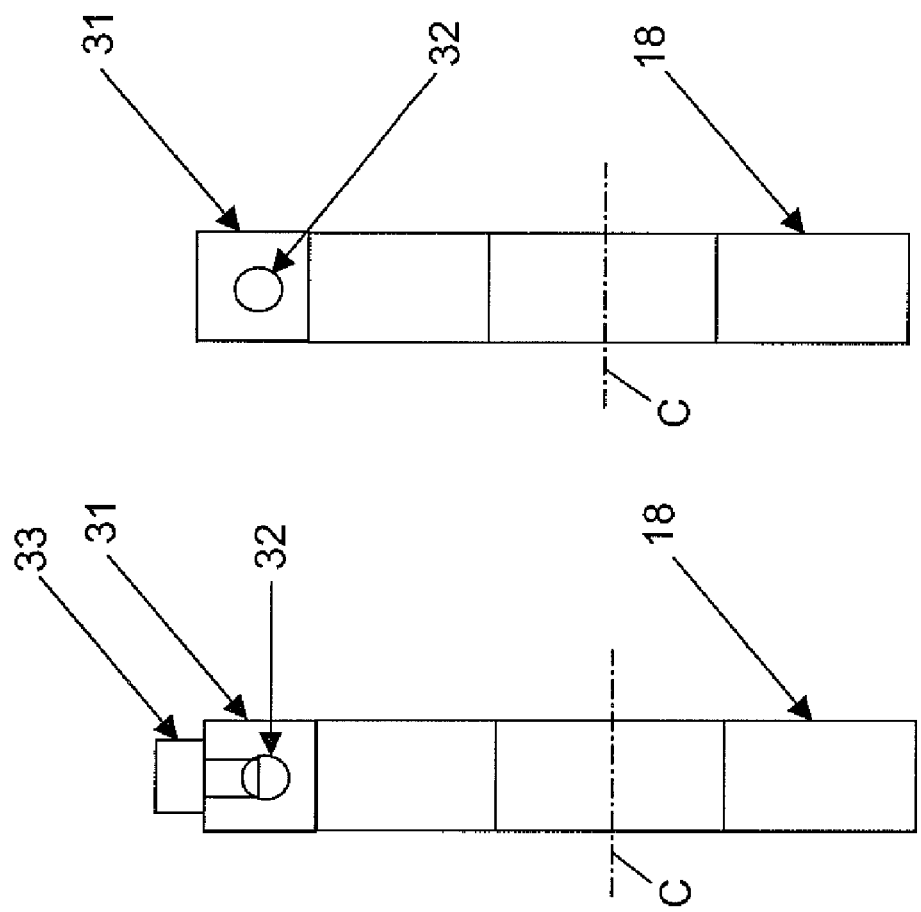

AIRCRAFT ELECTRICAL POWER TRANSFER ASSEMBLY

CROSS REFERENCE TO RELATED APPLICATIONS

The present application is a continuation of U.S. application Ser. No. 12/827,120 and is based on, and claims priority from, British Application Number GB0913128.5, filed Jul. 29, 2009, the disclosure of which is hereby incorporated by reference herein in its entirety.

FIELD OF THE INVENTION

The present invention relates to an assembly for an aircraft comprising a first structure mounted to a second structure, and a power transfer assembly electrically connecting the first and second structures, wherein the first structure is movable relative to the second structure between a retracted and an extended position.

BACKGROUND OF THE INVENTION

Ice protection of aircraft leading edge structures has traditionally been provided on large commercial aircraft through the use of bleed air. Smaller aircraft have used combinations of inflatable rubber de-icing boots, and de-icing fluid. Helicopters have had significant experience of electrical ice protection solutions. Most previous applications of helicopter electrical ice protection have been on fixed structures, which by definition do not move. The only exception to this being electrical ice protection on helicopter rotor blades where the power is transmitted through a slip ring system of joints, the technology of which is used over much of the engineering industry.

There is now a move to incorporate electrical de-icing systems into commercial fixed wing aircraft. The areas of commercial fixed wing aircraft that have particular need for ice protection are the movable leading edge slat structures.

Electrical power is transferred for other reasons across mechanically actuated joints. This is traditionally achieved in a variety of ways. For example, a folding arm type joint may have an electrical cable within each arm connected by a slip ring type rotary joint between the arms, which rotates as the arms are extended. A telescopic tube may have a helically wound electrical cable therein, similar to a telephone cable, the effective length of which changes with telescoping of the tube. An electrical cable may alternatively be encased by chain links, which limit the bend radius of the cable as the ends of the chain links are moved towards and away from one another.

The current technological options suffer various disadvantages of being heavy, having a high space requirement, causing fretting of an electrical cable, or excessive manipulation of an electrical cable which can cause electrical wires of the cable to break, leading to reliability issues.

WO2006/027624A describes a coupling arrangement for coupling services between an aircraft wing fixed aerofoil component and a extendable leading edge slat mounted thereto. The coupling arrangement includes a housing for connection to the fixed aerofoil structure, and a hollow telescopic assembly extendable between a retracted and an extended position. A service carrying conduit arrangement carries the services, such as electrical power cables, between the fixed aerofoil component and the leading edge slat, and extends through the hollow telescopic assembly. The service carrying conduit arrangement is flexible and excess thereof is located within the housing when the telescopic assembly is in the retracted position. The excess weight and space requirements of the housing for storing the excess of the flexible conduit, together with the manipulation of the electrical cables within the conduit when stored in the housing, exemplifies some of the problems with prior art solutions.

There is therefore a need in the art for an improved system for electrically connecting structures movable relative to one another.

SUMMARY OF THE INVENTION

A first aspect of the invention provides an assembly for an aircraft comprising a first structure mounted to a second structure, and a power transfer assembly electrically connecting the first and second structures, wherein the first structure is movable relative to the second structure between a retracted and an extended position, and wherein the power transfer assembly comprises a housing, a spool mounted for rotation with respect to the housing and biased to rotate in a first direction, and an electrical cable adapted to be wound around the spool when the spool rotates in the first direction, such that movement of the first structure from its retracted to its extended position causes the cable to be unwound from the spool by rotation of the spool in a second direction opposite the first.

A further aspect of the invention provides a method of electrically connecting a first structure mounted to a second structure, wherein the first structure is movable relative to the second structure between a retracted and an extended position, the method comprising:

physically and electrically connecting a power transfer assembly between the first and second structures, the power transfer assembly comprising a housing, a spool mounted for rotation with respect to the housing and biased to rotate in a first direction, and an electrical cable adapted to be wound around the spool when the spool rotates in the first direction; and moving the first structure from its retracted to its extended position accompanied by corresponding unwinding of the cable from the spool by rotation of the spool in a second direction opposite the first.

The present invention is advantageous in that the power transfer assembly is more lightweight, more compact and more reliable. The use of a cable spool leads to significant space savings when compared with folding arm connections, or extending/retracting chain links. Significant reliability improvement is provided by the elimination of excessive cable manipulation within the power transfer assembly.

The power transfer assembly may further comprise a spiral spring connected to the spool and to the housing for biasing the spool to rotate in the first direction. This provides a compact biasing solution with good reliability. Alternatively, other biasing means such as a helical spring may be used.

The power transfer assembly may further comprise an electrical connection terminal having a first portion fixed to the housing and a second portion rotatable with the spool, wherein the first and second portions are electrically connected, and the second portion is physically connected to one end of the cable. Electrical systems may be connected to the cable via the electrical connection terminal, which provides a reliable electrical connection.

The cable is preferably wound with a single full turn around the spool when the first structure is in its retracted position. The spool preferably has a diameter large enough to accommodate sufficient retracted cable length in a single full turn and to ensure the bend radius of the cable is sufficiently large, whilst being small enough to fit within a confined space. Where a greater length of retracted cable needs to be stored on the spool, the cable may be wound as a helix of multiple adjacent turns. Alternatively, if space dimensions allow, the cable may be wound as a spiral of multiple concentric turns.

The power transfer assembly housing preferably includes a pair of side plates one on either side of the spool. These side plates constrain the cable when wound about the spool and may be used to mount the housing to either the first structure or the second structure.

Preferably, the cable includes a bundle of power and signal routes. These routes may be bundled in groups and may be shielded to protect the signals in the signal routes from interference by the power routes. Alternatively, the cable could include a bundle of only power or signal routes.

A free end of the cable preferably has an electrical connection terminal for ease of connection or disconnection. The free end of the cable is that at the end of the unwound portion of the cable.

In a preferred embodiment, the power transfer assembly has a modular construction so that it may be installed, serviced and replaced easily. In particular, the power transfer assembly can be provided as a cassette incorporating the profile of the surrounding structure to which it is mounted.

The power transfer assembly housing may be mounted to either the first structure or the second structure, as desired.

In a preferred embodiment, the first and second structures are electrically connected by a plurality of the power transfer assemblies. Each power transfer assembly may be substantially identical. The plurality of power transfer assemblies may be arranged side by side.

The assembly may further comprise an actuator connected between the first and second structures for moving the first structure between its retracted and extended positions. Unwinding of the cable from the spool may be driven passively by movement of the first structure from its retracted to its extended position.

In a preferred embodiment, the first structure is a flight control surface and the second structure is a fixed aerofoil structure of an aircraft. The fixed aerofoil structure may include a cut-out in its aerodynamic leading edge through which the cable passes. The cut-outs need only be slightly larger than the diameter of the cable to provide sufficient clearance, and so they have minimal aerodynamic impact. Preferably, the cut-out is sealed around the cable by a sealing member. In particular, the first structure may be a leading edge slat and the second structure may be a fixed portion of an aircraft wing. This enables the slat to be disassembled easily without also having to disassemble the fixed leading edge. Also, there is no need for an open cut-out in the fixed leading edge, unlike the prior art power transfer solutions.

This invention has broad application and may be used to electrically connect virtually any pair of structures that are mounted together and are movable relative to one other. For example, the structures may be parts of a main oleo strut of an aircraft landing gear. In this case, the assembly may be used to supplying electrical power from the aircraft to, for example, an electrical wheel braking assembly.

BRIEF DESCRIPTION OF THE DRAWINGS

Embodiments of the invention will now be described with reference to the accompanying drawings, in which:

FIG. 4a illustrates a 3-D view of the power transfer assembly; and FIG. 4b illustrates an exploded 3-D view of the power transfer assembly;

FIG. 5 illustrates how a cable of the power transfer assembly is connected to the electrical routing of the fixed wing structure;

FIG. 6 illustrates a 3-D view of a seal member used to seal between the cable and a cut-out in the fixed wing leading edge through which the cable passes;

FIG. 7 illustrates cut-outs in the fixed leading edge D-nose panel and in the slat trailing edge panel for receiving the cables of two power transfer assemblies;

FIG. 8 illustrates a partial cut-away 3-D view of the wing leading edge looking forward from below and showing the two power transfer assemblies electrically connecting the extended slat to the fixed wing structure; and FIG. 8a shows Detail A of FIG. 8;

FIG. 9 illustrates a schematic view of the electrical connections of the power transfer assembly;

FIG. 10 illustrates generically a connection between one wire of the cable and the connection terminal of the power transfer assembly; and FIGS. 10a and 10b illustrate first and second variants respectively of the connection.

DETAILED DESCRIPTION OF EMBODIMENT(S)

Figure 1:
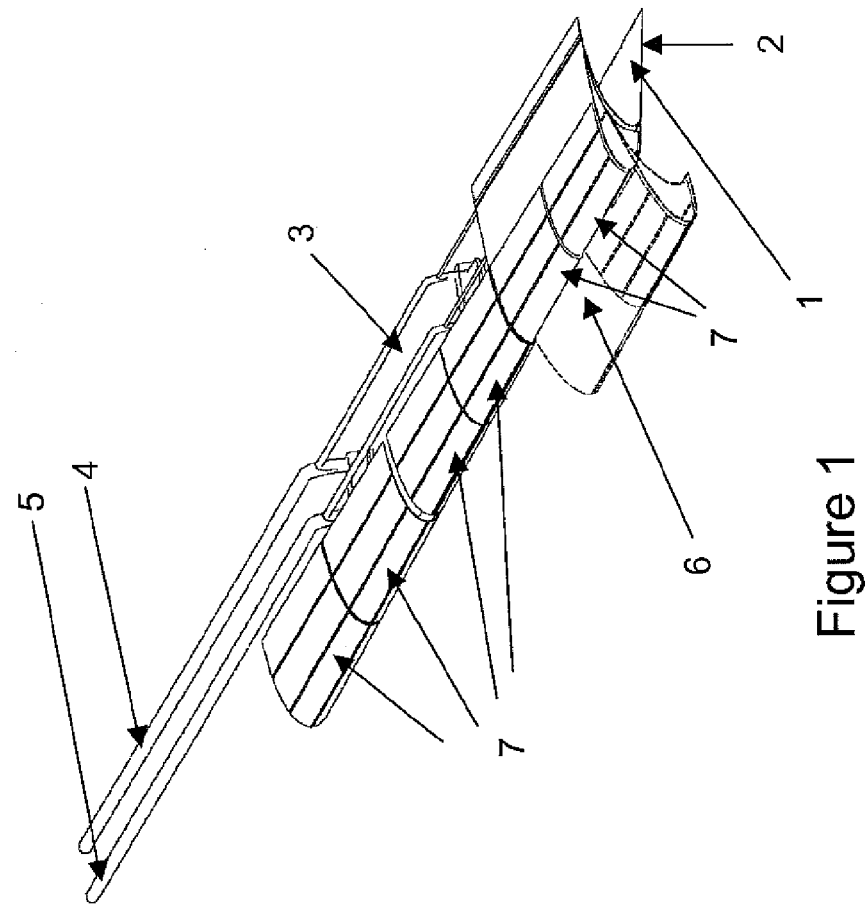
FIG. 1 illustrates a partial 3-D view of an aircraft wing leading edge having slats movable between extended and retracted positions, and showing typical power and signal electrical routing in the fixed wing leading edge.

FIG. 1 shows an aircraft wing leading edge. The aircraft wing includes a fixed aerofoil structure 1 having a leading edge "D-nose" panel 2. In a cavity 3 behind the D-nose panel 2 runs a power route 4 and a signal route 5 for electrically controlling aircraft systems on the wing.

The aircraft wing further includes a plurality of leading edge slats 6 mounted to the fixed aerofoil structure 1. The slats 6 are translationally movable relative to the fixed aerofoil structure 1 between a retracted position (shown in full line) and an extended position (shown in broken line). The slat 6 is driven between its retracted and extended positions by a conventional actuator (not shown). The slats 6 have an array of electro-thermal heater mats 7 for providing de-icing protection to the slat leading edge. The electro-thermal heater mats 7 are electrically controlled via the power route 4 and the signal route 5 using one or more power transfer assemblies 8.

Figure 2:
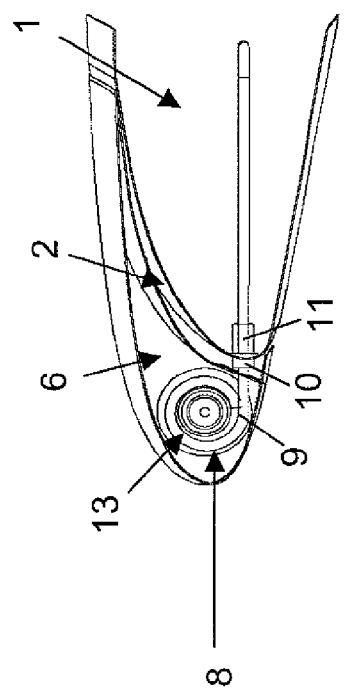
FIG. 2 illustrates a partial cut-away view of the wing leading edge showing a power transfer assembly electrically connecting the slat to the fixed wing leading edge, with the power transfer assembly and the slat in their retracted positions.
Figure 3:
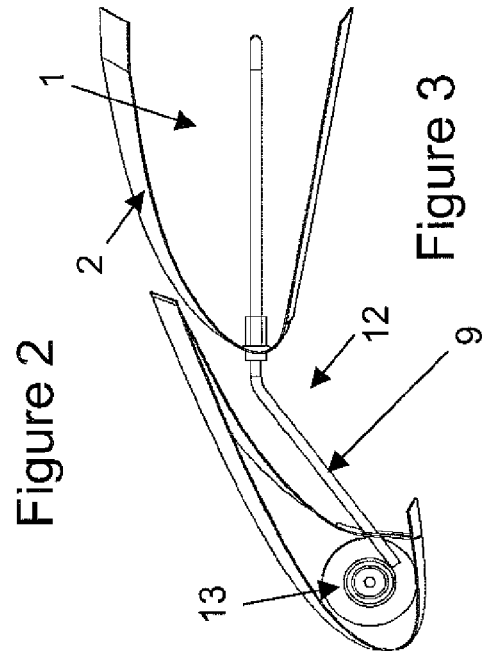
FIG. 3 illustrates a partial cut-away view of the wing leading edge showing the power transfer assembly and the slat in their extended positions.

FIG. 2 shows one of the power transfer assemblies located in a cavity behind the leading edge of the slat 6. The power transfer assembly 8 includes a cable 9 having an electrical connector terminal 10 which is threadably connected to a mating electrical connector terminal 11 of the fixed aerofoil structure 1. FIG. 2 shows the slat 6 in its retracted position and FIG. 3 shows the slat 6 in its extended, or deployed, position in which a slot 12 is opened up between the slat 6 and the fixed aerofoil structure 1. When the slat 6 is in its retracted position as shown in FIG. 2, the cable 9 is wound about a spool 13 of the power transfer assembly 8. As the slat 6 is moved from its retracted position to its extended position as shown in FIG. 3, the cable 9 is unwound from the spool 13 such that an unwound portion of the cable 9 bridges the slot 12 between the slat 6 and the fixed aerofoil structure 1. In this way, it is possible to provide electrical control to the electro-thermal heater mats 7 even when the slat 6 is in its extended position.

The power transfer assembly 8 will now be described in greater detail with respect to FIGS. 4a and 4b. The power transfer assembly 8 comprises a housing 14a, 14b, a spool 13 mounted for rotation with respect to the housing 14a, 14b and biased to rotate in a first direction by a pair of steel spiral springs 15a, 15b. The electrical cable 9 is adapted to be wound around the spool 13 when the spool rotates in the first direction. The spiral springs 15a, 15b are retained in grooves 16 at either end of the spool 13 (Only one groove is visible in FIG. 4b).

The power transfer assembly 8 further includes an electrical connection terminal comprising a first stator portion 17 fixed to the housing 14a, 14b, and a second rotor portion 18 rotatable with the spool 13. The rotor and stator portions 17, 18 are electrically connected by respective connection pads 17a, 18a, which will be described in greater detail below. The stator portion 17 is connected to the electro-thermal heater mats 7 and the rotor portion 18 is connected to one end of the cable 9.

The cable 9 is wound with a single full turn around the spool 13 when the power transfer assembly is in its retracted position. The cable 9 includes a bundle of power and signal routes. There may be several tens or even in excess of a hundred individual power and/or signal routes within the cable bundle. Due to the large number of individual wiring routes within the cable 9, the diameter of the spool 13 is relatively large so as to prevent excessive manipulation of the cable which could cause fatigue damage and result in failure of at least one of the wiring routes within the cable bundle. A minimum bend radius criteria is therefore applied for the cable 9 on the spool 13 such that the bend radius is six times the diameter of the cable. The cable typically has a diameter of around ten millimeters but may be greater or smaller than this depending on the number of individual wiring routes required.

FIG. 5 shows one of the power transfer assemblies 8 installed in the slat 6 ready for connection to the fixed aerofoil structure 1. Two such power transfer assemblies 8 are used to connected the slat 6 to the fixed aerofoil structure 1. The construction of the power transfer assembly 1 facilitates a modular slat design philosophy whereby as many slat components as possible are preinstalled in the slat 6 prior to mounting to the fixed aerofoil structure 1 during final assembly of a new aircraft. This design philosophy also has benefits in terms of improved serviceability during the aircraft's operational lifetime.

As shown in FIG. 5, the unconnected cable 9 is initially biased by the spiral springs 15a, 15b to be wound around the spool 13. The modular slat 6 is mounted to the fixed aerofoil structure 1 by means of a conventional slat actuation mechanism (not shown).

The slat actuation mechanism typically includes a slat track on which the slat 6 moves relative to the fixed aerofoil structure 1 under control of an actuator. Once the slat 6 has been mounted to the fixed aerofoil structure 1, the free end of the cable 9 of the power transfer assembly 8 having the electrical connector terminal 10 is pulled against the biasing action of the spiral springs 15a, 15b to unwind at least a portion of the cable 9 from the spool 13. With the cable 9 at least partially unwound, the electrical connector terminal 10 is connected to the electrical connector terminal 11. The electrical connector terminals 10, 11 are co-operating standard threaded terminals. The electrical connector terminal 11 is fixed to one end of a cable 20 which is electrically connected to the power and/or signal routes 4, 5 in the leading edge of the fixed aerofoil structure 1.

The electrical connector terminal 11 is located just behind the aerodynamic leading edge of the fixed aerofoil structure 1. So that the connector terminal 10 may be threadably connected to the terminal 11, a cut-out 21 is formed in the aerodynamic leading edge of the fixed aerofoil structure 1. The free end of the cable 9 having the connector terminal 10 is sealed within the cut-out 21 by a seal member 22, shown in FIG. 6. The seal member 22 prevents fretting of the cable 9, provides a flat landing surface for the terminal 11, and provides a good aerodynamic and weatherproof seal in the leading edge of the fixed aerofoil structure 1. The seal member 22 has a sealing flange 23 around an aperture 24. The cable 9 is passed through the aperture 24 and the sealing flange 23 sits against the rear surface of the D-nose panel 2 around the periphery of the cut-out 21. The seal member 22 is made of injection moulded thermoplastic material.

Since the power transfer assembly 8 is mounted within the slat 6, the cable 9 must also pass through a rear panel 25 of the slat 6. The slat rear panel 25 therefore also has a cut-out 26 which receives the cable 9. FIG. 7 shows a schematic view of the D-nose panel 2 of the fixed aerofoil structure 1 and the rear panel 25 of the slat 6. Two cut-outs 21 are provided in the D-nose panel 2 and two cut-outs 26 are provided in the slat rear panel 25. Each pair of cut-outs 21, 26 is adapted to receive a respective cable 9 of each of the power transfer assemblies 8.

FIG. 8 shows a cut away view of the fixed aerofoil structure 1 with the slat 6 in its extended position electrically connected by the two power transfer assemblies 8. FIG. 8a shows Detail A of FIG. 8. In FIGS. 8 and 8a, the seal members 22 in the cut-outs 21 are not shown. The housing 14a, 14b of each power transfer assembly 8 can be seen through the cut-outs 26 in the slat rear panel 25. Where two power transfer assemblies are provided, as shown, one of these may carry a bundle of power routes and the other may carry a bundle of signal routes for connection to the power and signal routes 4, 5, respectively. However, it will be appreciated by those skilled in the art that more than two power transfer assemblies may be provided to connect the slat 6 to the fixed aerofoil structure 1; each power transfer assembly 8 may carry both power and signal routes; or only a single power transfer assembly 8 may be provided to electrically connect the slat 6 and the fixed aerofoil structure 1, depending on requirements.

It is to be noted that the cut-outs 21 in the D-nose panel 2 are significantly smaller than would be required for a prior art folding arm type power transfer assembly, which significantly reduces aerodynamic drag, noise and fuel consumption of the aircraft. The cut-outs 21, 26 are ovoid to account for the vertical change in orientation of the cable 9 within these cut-outs during deployment of the slat 6 from its retracted to its extended position. The cut-outs 26 in the rear slat panel 25 may also have a rubber seal (not shown) around the periphery of the cut-out to prevent fretting of the cable 9.

FIG. 9 shows a schematic cross section view through the power transfer assembly 8 showing the electrical connection on one side of a centreline C. The cable 9 is wound between the side plates 14a, 14b of the housing and carries a bundle of wiring routes electrically connected to the power or signal routes 4, 5 of the fixed aerofoil structure 1. At the end of the cable 9 fixed to the spool 13, individual wiring routes of the cable bundle are electrically connected to the rotor portion 18 of the electrical connection terminal by connections 27.

These connections will be described in greater detail with reference to FIGS. 10, 10a and 10b below.

Connection pads 18a of the rotor portion 18 interface with the connection pads 17a of the stator portion 17 of the electrical connection terminal The stator portion 17 is bonded to the side plates 14a, 14b. The rotor portion 18 is rotatable with respect to the side plates 14a, 14b within limits defined by the steel spiral springs 15a, 15b connected between the rotor portion 18 and the side walls 14a, 14b which sit in the grooves 16 in the rotor portion 18. A threaded electrical connection socket 28 is fixed to the stator portion 17 and is electrically connected to the stator portion 17 by connections 29. These connections 29 are similar to the connections 27.

The threaded electrical connection socket 28 is threadably connected to a mating threaded electrical connection socket 36 fixed to one end of a slat cable 30 which is electrically connected to electrical equipment, such as the electro-thermal heating mats 7 and lighting, for example, of the slat 6.

FIG. 10 shows schematically one of the connections 27 between an individual wiring route and the electrical connection terminal 17, 18. FIGS. 10a and 10b show two alternative variants of the connection 27 which may be used. In the variant shown in FIG. 10a the rotor portion 18 has a local connector portion 31 having a hole 32 which receives an exposed electrically conductive end of an individual wiring route of the cable bundle 9 and which is held in place in the hole 32 by tightening a screw 33. In the variant shown in FIG. 10b, the screw 33 is omitted and the exposed electrically conductive end of the individual wiring route located within the hole 32 is welded in place to form the electrical connection with the rotor portion 18.

Figure 11:
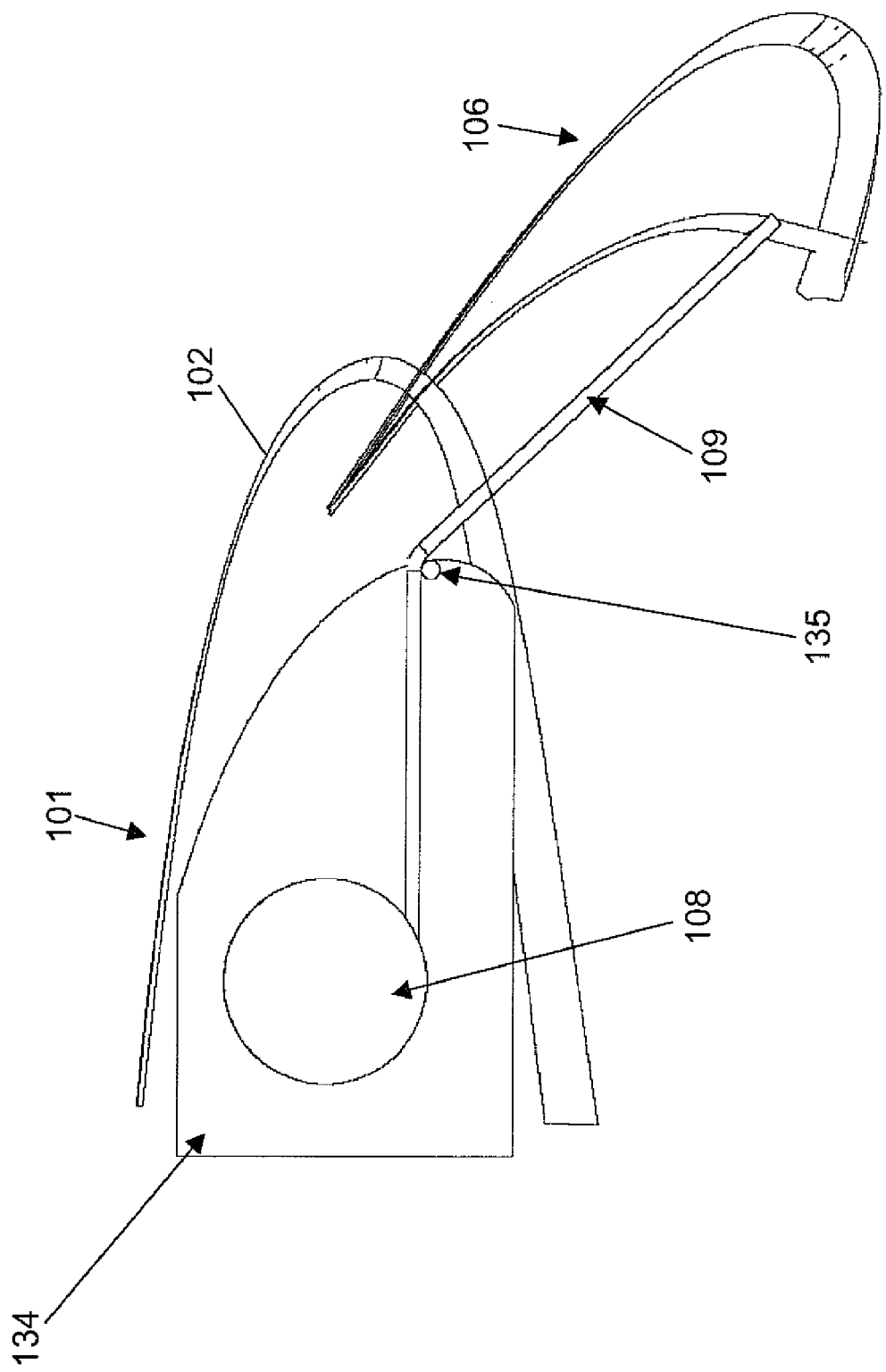
FIG. 11 illustrates an alternative embodiment in which the power transfer assembly housing is mounted to the fixed wing structure.

In the embodiment described above, the power transfer assembly or assemblies 8 are mounted within the slat cavity. However, in accordance with a second embodiment of this invention as depicted in FIG. 11, the power transfer assembly or assemblies are installed in the leading edge of the fixed aerofoil structure. As shown in FIG. 11, a slat 106 is mounted to the leading edge of a fixed aerofoil portion 101 and is shown in its extended position forward of the D-nose panel 102. The fixed aerofoil structure 101 includes a "D-rib" 134 of a conventional type and each power transfer assembly 108 is attached or bonded to one of these D-ribs 134 located span-wise across the wing leading edge.

The second embodiment differs from the first embodiment essentially only in that the power transfer assembly is attached to the fixed aerofoil structure rather than to the slat. In addition, to prevent fretting of the cable 109, a roller element 135 is located just behind the D-nose panel 102 over which the cable 109 passes as the slat 106 is moved between its extended and retracted positions. The configuration of the second embodiment shown in FIG. 11 may be used where there is insufficient space within the slat cavity to accommodate the power transfer assembly, or where it is desirable to do so for other reasons.

Due to the large aerodynamic forces experienced in the region between the slat and the fixed aerofoil structure when the slat is in its extended position, it may be necessary to constrain the cable of the power transfer assembly to prevent or reduce impact and excessive vibration of the unwound portion of the cable. The unwound portion of the cable may be housed within a telescoping tube arrangement, or the unwound portion of the cable may be slidably connected to the slat actuation mechanism. For example, where the slat actuation mechanism includes a slat track, the slat track may be fitted with one or more swivel clips which retain the unwound portion of the cable which is freely slidable within the clips. The exact construction of these and alternative retaining means will be readily appreciated by those skilled in the art.

Whilst the spool of the power transfer assembly preferably has a diameter large enough to accommodate sufficient retracted cable length in a single full turn, where a greater length of retracted cable length needs to be stored on the spool, the cable may be wound as a helix of multiple adjacent turns on the spool. Alternatively, the cable may be wound as a spiral of concentric turns upon the spool.

Whilst in the embodiments described above the power transfer assembly is used to electrically connect a slat to a fixed aerofoil portion of an aircraft wing, this invention has broad application and may be used to electrically connect virtually any pair of structures that are mounted together and are movable relative to one another. For example, the structures may be parts of a main oleo strut of an aircraft landing gear. In this case, the assembly may be used to supply electrical power from the aircraft to, for example, an electrical wheel breaking assembly.

Although the invention has been described above with reference to one or more preferred embodiments, it will be appreciated that various changes or modifications may be made without departing from the scope of the invention as defined in the appended claims.

The invention claimed is:

1. An aircraft assembly comprising a flight control surface mounted to a fixed aerofoil structure, and a power transfer assembly electrically connecting the flight control surface and fixed aerofoil structure, wherein the flight control surface is movable translationally relative to the fixed aerofoil structure between a retracted and an extended position, and wherein the power transfer assembly comprises a housing mounted to the flight control surface, a spool mounted for rotation with respect to the housing and biased to rotate in a first direction, and an electrical cable wound around the spool when the spool rotates in the first direction, wherein movement of the flight control surface from its retracted to its extended position causes the cable to be unwound from the spool by rotation of the spool in a second direction opposite the first.

2. An assembly according to claim 1, wherein the power transfer assembly further comprises a spiral spring connected to the spool and to the housing for biasing the spool to rotate in the first direction.

3. An assembly according to claim 1, wherein the power transfer assembly further comprises an electrical connection terminal having a first portion fixed to the housing and a second portion rotatable with the spool, wherein the first and second portions are electrically connected, and the second portion is physically connected to one end of the cable.

4. An assembly according to claim 1, wherein the cable is wound with a single full turn around the spool when the first structure is in its retracted position.

5. An assembly according to claim 1, wherein the housing includes a pair of side plates one on either side of the spool.

6. An assembly according to claim 1, wherein the cable includes a bundle of power and signal routes.

7. An assembly according to claim 1, wherein a free end of the cable has an electrical connection terminal 8. An assembly according to claim 1, wherein the power transfer assembly has a modular construction.

9. An assembly according to claim 1, wherein the flight control surface and fixed aerofoil structure are electrically connected by a plurality of the power transfer assemblies.

10. An assembly according to claim 1, further comprising an actuator connected between the flight control surface and fixed aerofoil structure for moving the flight control surface between its retracted and extended positions.

11. An assembly according to claim 1, wherein unwinding of the cable from the spool is driven passively by movement of the flight control surface from its retracted to its extended position.

12. An assembly according to claim 1, wherein the fixed aerofoil structure includes a cut-out in its aerodynamic leading edge through which the cable passes.

13. An assembly according to claim 12, wherein the cut-out is sealed around the cable.

14. A method of electrically connecting a flight control surface mounted to a fixed aerofoil structure, wherein the flight control surface is movable translationally relative to the fixed aerofoil structure between a retracted and an extended position, the method comprising:
- physically and electrically connecting a power transfer assembly between the flight control surface and fixed aerofoil structure, the power transfer assembly comprising a housing mounted to the flight control surface, a spool mounted for rotation with respect to the housing and biased to rotate in a first direction, and an electrical cable wound around the spool when the spool rotates in the first direction; and
- moving the flight control surface from its retracted to its extended position accompanied by corresponding unwinding of the cable from the spool by rotation of the spool in a second direction opposite the first.

\* \* \* \* \*